R. McFARLANE.
SCALE.
APPLICATION FILED FEB. 2, 1911. RENEWED DEC. 16, 1912.

1,072,020.

Patented Sept. 2, 1913.

WITNESSES

INVENTOR
ROBERT McFARLANE
BY Paul & Paul
ATTORNEYS

UNITED STATES PATENT OFFICE.

ROBERT McFARLANE, OF MINNEAPOLIS, MINNESOTA, ASSIGNOR TO McFARLANE MANUFACTURING COMPANY, OF CHICAGO, ILLINOIS, A CORPORATION OF ILLINOIS.

SCALE.

1,072,020. Specification of Letters Patent. Patented Sept. 2, 1913.

Application filed February 2, 1911, Serial No. 606,249. Renewed December 16, 1912. Serial No. 737,129.

*To all whom it may concern:*

Be it known that I, ROBERT McFARLANE, of Minneapolis, Hennepin county, Minnesota, have invented certain new and useful Improvements in Scales, of which the following is a specification.

My invention relates to weighing scales and the object of the invention is to provide an attachment for a platform scale by means of which the weight of the load on the platform can be determined at a glance.

A further object is to provide a weighing scale which may be used with or without the main beam of the scale, as desired.

Other objects of the invention will appear from the following detailed description.

The invention consists generally in providing a weighing scale in which the weights or springs ordinarily employed to resist oscillation of the beam under the weight of the load are entirely omitted and the scale adapted for weighing light or heavy loads without the complication of parts usually necessary or incidental to scales of this type.

Figure 1:
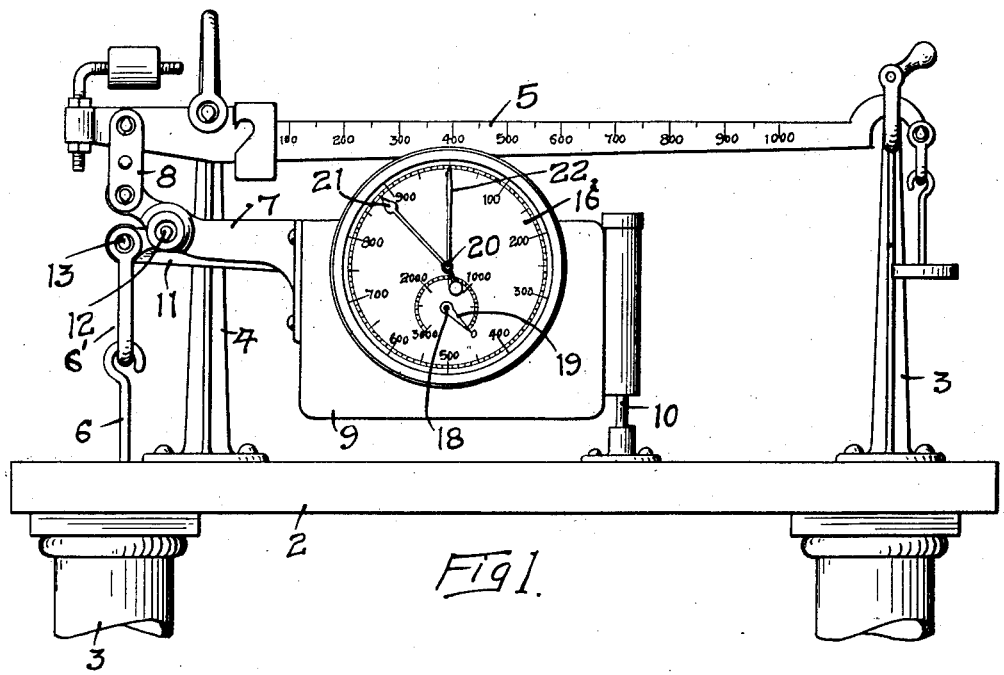
Figure 2:
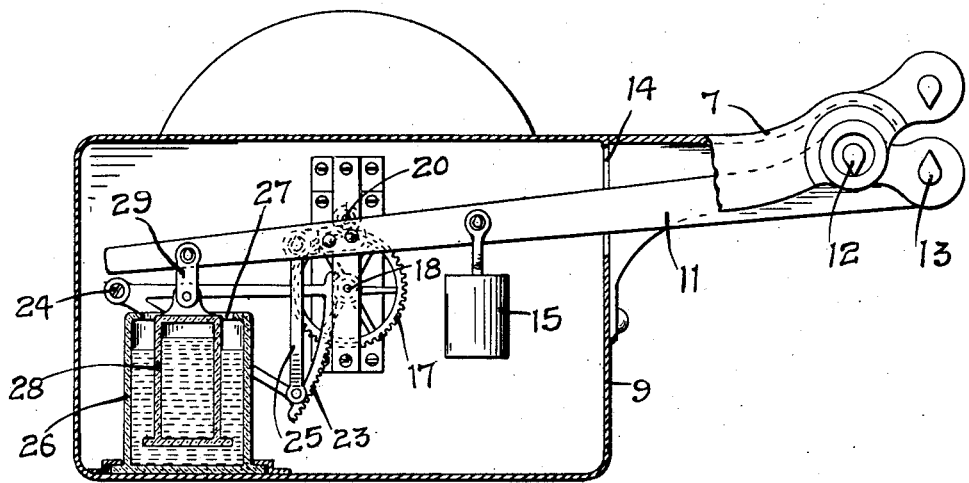

In the accompanying drawing forming part of this specification, Figure 1 is a front view of the upper portion of a platform scale with my invention applied thereto, Fig. 2 is a sectional view illustrating the mechanism of the scale.

In the drawing, 2 represents the upper portion of the scale and 3 and 4 standards mounted thereon, on one of which the main scale beam 5 is pivotally supported in the usual way.

6 is the scale rod extending to the platform levers, not shown.

Between the scale rod and the beam 5 I interpose a pair of levers. The lever 7 is pivotally connected by a link 8 with the short arm of the beam 5 and carries, preferably, a casing 9. The end of this casing opposite from the pivotal support of the lever 7 rests upon a support 10 that is carried by the upper portion of the scale, as shown in Fig. 1. The casing is free to rock on this support and is merely held thereby in a horizontal position. A second lever 11 is pivoted at 12 on the lever 7 and has a pivotal support 13 for the rod 6 which is suspended thereon by the U-shaped link 6'. The lever 11 extends preferably through a slot 14 in the end wall of the casing and is provided within said casing with a weight 15. A dial 16 is mounted on the front of the casing and a gear 17 is journaled in said casing and has a stud 18 provided with an indicator hand 19 that moves over graduations representing thousands of pounds on the face of the dial 16. A post 20 is provided above the gear 19 and has a pinion meshing with said gear and carries indicator hands 21 and 22 which move over the outer circle of graduations on the dial. The movement of the lever is transmitted to the gear 17 through a quadrant rack 23 that is pivoted at 24 on the wall of the casing and is connected with said lever by a link 25. The levers 7 and 11 are relatively movable and as the pivots 12 and 13 are comparatively near together the long arm of the lever 11 will have considerable leverage on the connections with the scale platform and a comparatively small weight or spring would ordinarily be sufficient to counter-balance the load. In weighing heavy loads, however, the leverage must be multiplied or extremely heavy springs or weights used and I have found that both weights and springs for this purpose are unsatisfactory, and I therefore make use of the dash-pot device shown in Fig. 2, consisting of a cup or cylinder 26 supported by the casing 9 and the lever 7 and adapted to contain a liquid of a high degree of density, such as mercury. The cup has an opening 27 in the top to receive a plunger or piston 28, preferably hollow to contain a quantity of mercury and pivotally connected with the lever 11 by a link 29. As the plunger descends in the cup it will displace the mercury therein and the downward pull of the lever will decrease in proportion to the displacement of the mercury in the cup. As the lever rises and the plunger ascends in the cup the weight of the plunger and the mercury therein will resist the downward pull of the load until the beam comes to a balance. I prefer to employ mercury in this dash-pot as I am able to adapt it for weighing heavy loads where a dash-pot containing oil or similar fluid of less specific gravity than mercury would have to be made so large as to be impracticable for the purpose.

I have shown this two-lever scale attachment in connection with the main beam of a scale but do not confine myself to this application, as it is capable of use for weighing purposes independently of the scale beam.

The size of the cylinder and plunger will be varied to adapt the dash-pot to the desired capacity of the scale and in various ways the details of construction may be modified without departing from my invention.

I claim as my invention:

1. A weighing scale comprising a scale beam, a lever pivotally supported thereby, a second lever pivotally supported on said first named lever and having means for connection with a platform or load support, a dash-pot device interposed between said levers and gradually increasing the load on the long arm of one of said levers as said lever ascends under the weight of the load on said platform, a dial and indicator hand carried by one lever and means operatively connecting said indicator hand with the other lever.

2. A weighing scale comprising a scale beam, a lever pivotally supported thereby, a second lever pivotally supported on said first named lever and having means for connection with a platform or load support, a dash-pot comprising a cup supported on one of said levers and containing a suitable liquid, a plunger attached to the other lever and movable in said cup, ascending or descending therein as its lever is operated, the ascent of said plunger increasing the load on its lever to counter balance the load on the platform.

3. A weighing scale comprising a scale beam, a lever pivotally supported thereby, a second lever pivotally supported on said first named lever and having means for connection with a platform or load support, a cup carried by one of said levers and having an open top and adapted to contain a quantity of mercury, a hollow plunger also containing mercury adapted to move vertically through the opening in the top of said cup and connected with the other lever, said plunger moving up and down with the long arm of its lever and offering an increasing or decreasing resistance to the movement of said arm.

4. A scale comprising a weighing beam and a poise weight, a lever connected to the short arm of said beam, a second lever pivotally connected with said first named lever, means attached to said second lever for connection with a load support, a dash-pot device, including a cup containing a quantity of mercury, carried by one of said levers, a hollow plunger also containing a quantity of mercury adapted to move vertically in said cup and connected with the long arm of said second lever, said dash-pot device resisting relative movement of said levers, and a weight indicator operatively connected with one of said levers.

5. In a platform scale, the combination, of a beam rod in two sections, levers connected to each section and pivoted together near the corresponding adjacent ends, a variable counter-poising means including a dash-pot interposed between the long arms of said levers and resisting relative movement thereof, means interposed between said dash-pot and the pivots of said levers for indicating the movement of the levers upon each other proportionate to the load on the scale.

6. A weighing scale comprising a scale beam, a lever pivotally supported thereby, a beam or second lever pivotally supported on said first named lever near their corresponding adjacent ends and having means for connection with a platform or load support, a dash pot device interposed between the long arms of said levers and resisting relative movement thereof, and a weight indicating mechanism operatively connected with said levers and interposed between said dash-pot device and the pivots of said levers.

7. A weighing scale comprising a pivotally supported lever, a casing connected therewith, a beam or second lever pivotally supported on said first named lever near their corresponding adjacent ends and having means for connection with a platform or load support, said casing having an opening in its wall to receive the long arm of said second lever, a variable counter-poising means, including a dash-pot device arranged within said casing and having one member attached to said casing and the other member attached to the long arm of said second lever and resisting relative movement of said levers, and a weight indicating mechanism operatively connected with said casing and said second lever and interposed between said dash-pot device and the pivots of said levers.

8. In a platform scale, a poise controlled weighing beam graduated to indicate the weight of heavy loads, a rod adapted for connection with platform levers, a lever suspended on said weighing beam, a second lever pivoted on said first named lever near their corresponding adjacent ends and connected with said rod, a variable counter-poising means, including a dash-pot device interposed between the long arms of said levers and resisting relative movement thereof, a weight indicating mechanism operatively connected with said levers and interposed between said dash-pot and the pivots of said levers and including a pointer and dial, also graduated to indicate the weight of heavy loads, said pointer and dial enabling the operator to determine at a glance the weight of the load on said platform without adjusting said poise weight, the subsequent balancing of said beam verifying or checking the weight indicated by said pointer and dial.

9. A weighing scale comprising a scale beam, a lever pivotally supported thereby, a second lever supported on said first named lever and having means for connection with a platform or load support, a variable counter-poising means including a cylinder and piston connected respectively with said levers and yieldingly resisting relative movement thereof, and a weight indicating mechanism operatively connected with said levers.

10. In a platform scale, the combination, of a beam-rod in two sections, levers connected to each section and pivoted together, a dash-pot device having its members connected respectively to said levers and alone resisting relative movement of said levers, and means for indicating the movement of said levers with respect to one another proportionately to the load on the scale.

In witness whereof, I have hereunto set my hand this 31st day of January, 1911.

ROBERT McFARLANE.

Witnesses:
GENEVIEVE E. SORENSEN,
C. H. REHFUSS.

Copies of this patent may be obtained for five cents each, by addressing the "Commissioner of Patents, Washington, D. C."